United States Patent
Koziol et al.

(10) Patent No.: US 12,245,268 B2
(45) Date of Patent: Mar. 4, 2025

(54) METHOD, APPARATUS, COMPUTER PROGRAM PRODUCT AND COMPUTER PROGRAM

(71) Applicant: Nokia Technologies Oy, Espoo (FI)

(72) Inventors: Dawid Koziol, Wroclaw (PL); Ping-Heng Kuo, London (GB)

(73) Assignee: Nokia Technologies Oy, Espoo (FI)

( * ) Notice: Subject to any disclaimer, the term of this patent is extended or adjusted under 35 U.S.C. 154(b) by 322 days.

(21) Appl. No.: 17/609,679

(22) PCT Filed: May 13, 2019

(86) PCT No.: PCT/EP2019/062177
§ 371 (c)(1),
(2) Date: Nov. 8, 2021

(87) PCT Pub. No.: WO2020/228938
PCT Pub. Date: Nov. 19, 2020

(65) Prior Publication Data
US 2022/0232581 A1 Jul. 21, 2022

(51) Int. Cl.
*H04W 72/12* (2023.01)
*H04W 72/20* (2023.01)
*H04W 72/566* (2023.01)
*H04W 74/00* (2009.01)

(52) U.S. Cl.
CPC ......... *H04W 72/569* (2023.01); *H04W 72/20* (2023.01); *H04W 74/002* (2013.01)

(58) Field of Classification Search
CPC .. H04W 74/002; H04W 72/569; H04W 72/20
See application file for complete search history.

(56) References Cited

U.S. PATENT DOCUMENTS

| | | | |
|---|---|---|---|
| 2020/0314883 A1* | 10/2020 | Chin | H04W 80/02 |
| 2022/0132556 A1* | 4/2022 | Alabbasi | H04W 72/569 |

FOREIGN PATENT DOCUMENTS

| | | |
|---|---|---|
| CN | 108513735 A | 9/2018 |
| WO | 2018/010673 A1 | 1/2018 |
| WO | 2020/144403 A1 | 7/2020 |

OTHER PUBLICATIONS

"E-mail discussion summary [103bis#41] [NR/IIoT] Intra-UE Prioritization (Nokia)", 3GPP TSG-RAN WG2 #104, R2-1817579, Agenda: 11.7.3, Nokia, Nov. 12-16, 2018, pp. 1-45.
"New WID: Support of NR Industrial Internet of Things (IoT)", 3GPP TSG RAN Meeting #83, RP-190728, Agenda: 9.1.2, Nokia, Mar. 18-21, 2019, 6 pages.
(Continued)

*Primary Examiner* — Derrick V Rose
(74) *Attorney, Agent, or Firm* — Joseph C. Drish; McCarter & English, LLP

(57) ABSTRACT

A method comprises determining in a medium access control MAC apparatus that data from a different logical channel is to be transmitted onto a shared channel. The method comprises causing an indication to be provided to a physical PHY apparatus that the data from the different logical channel is to be transmitted on the shared channel before packet data units associated with that different logical channel are provided to the physical apparatus.

37 Claims, 9 Drawing Sheets

(56) References Cited

OTHER PUBLICATIONS

"Consideration on standardization impacts of intra-UE prioritization", 3GPP TSG-RAN WG2 Meeting #105bis, R2-1904986, Agenda: 11.7.3, Fujitsu, Apr. 8-12, 2019, pp. 1-4.
"Intra-UE prioritization: Role of PHY in prioritization", 3GPP TSG-RAN WG2 Meeting #105bis, R2-1904666, Agenda: 11.7.3, Qualcomm Incorporated, Apr. 8-12, 2019, pp. 1-28.
"UL data prioritization for the DG/CG conflict and the CG/CG conflict", 3GPP TSG-RAN WG2 Meeting #105bis, R2-1905016, Agenda: 11.7.3, LG Electronics Inc, Apr. 8-12, 2019, pp. 1-3.
International Search Report and Written Opinion received for corresponding Patent Cooperation Treaty Application No. PCT/EP2019/062177, dated Dec. 16, 2019, 11 pages.
"New WID on enhanced Industrial Internet of Things (IoT) and URLLC support", 3GPP TSG RAN Meeting #86, RP-193233, Agenda: 9.1.2, Nokia, Dec. 9-12, 2019, 5 pages.

\* cited by examiner

METHOD, APPARATUS, COMPUTER PROGRAM PRODUCT AND COMPUTER PROGRAM

RELATED APPLICATION

This application claims priority to PCT Application No. PCT/EP2019/062177, filed on May 13, 2019, the contents of which is incorporated herein by reference in its entirety.

FIELD OF THE DISCLOSURE

The present disclosure relates to an apparatus, methods, and computer programs and in particular but not exclusively for apparatus, methods and computer programs to be used in a communications device.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided a method comprising: determining in a medium access control apparatus that data from a different logical channel is to be transmitted on a shared channel; and causing an indication to be provided to a physical apparatus that said data from the said different logical channel is to be transmitted on the shared channel before a packet data unit associated with data from that different logical channel is provided to the physical apparatus.

The indication may comprise information indicating that a transmission which is currently being or to be conducted on the shared channel is to stop.

The transmission which is currently being or to be conducted on the shared channel may be one of cancelled and delayed.

The determining may comprise determining that a different logical channel is associated with a higher priority than at least one logical channel relating to the transmission which is currently being or to be conducted on the shared channel.

The indication may comprise information indicating that the different logic channel is associated with a higher priority.

A plurality of the transmissions may be currently being or to be conducted on the shared channel, and the indication may comprise information indicating which of the transmissions is to be stopped.

The indication may comprise information indicating when a transmission of said packet data unit associated with data from that different logical channel is to start.

The method may comprise receiving from said physical apparatus information indicating if it is feasible to stop a transmission which is currently being or to be conducted on the shared channel.

The method may comprise in response to the information indicating that it is not feasible to stop the transmission which is currently being or to be conducted on the shared channel, stop processing of packet data units associated with that different logical channel.

The method may comprise in response to the information indicating that it is feasible to stop the transmission which is currently being or to be conducted on the shared channel, process the packet data units associated with that different logical channel, and deliver the packet data units to the physical apparatus.

The method may comprise receiving from said physical apparatus information indicating if it is feasible to stop a transmission which is currently being or to be conducted on the shared channel before the transmission of said packet data unit associated with data from that different logical channel is due to start.

The information may indicate if it is feasible to stop the transmission which is currently being or to be conducted on the shared channel and prepare for the transmission associated with the different logical channel before the transmission of said packet data unit associated with data from that different logical channel is due to start.

The information may indicate if the transmission which is currently being or to be conducted on the shared channel is comprising or relating to control information associated to at least one logical channel with priority higher than the different logical channel.

The method may be performed in the medium access control apparatus.

The shared channel may comprise one or more physical uplink channels.

According to another aspect, there is provided a method comprising: determining in a medium access control apparatus that data from a different logical channel is to be transmitted on a shared channel; and receiving from said physical apparatus information indicating if it is feasible to stop a transmission which is currently being or to be conducted on the shared channel.

One or more features of the previous aspect may be provided in conjunction with this aspect.

According to another aspect, there is provided a method comprising: receiving an indication in a physical apparatus from a medium access control apparatus that data from a different logical channel is to be transmitted on a shared channel; and subsequently receiving a packet data unit associated with that different logical channel.

The indication may comprise information indicating that a transmission which is currently being or to be conducted on the shared channel is to stop.

The transmission which is currently being or to be conducted on the shared channel may be one of cancelled and delayed.

The indication may comprise information indicating that the different logic channel is associated with a higher priority.

A plurality of the transmissions may be currently being or to be conducted on the shared channel and the indication may comprise information indicating which of the transmissions is to be stopped.

The indication may comprises information indicating when a transmission of said packet data unit associated with data from that different logical channel is to start.

The method may comprise providing information from said physical apparatus to said medium access control apparatus indicating if it is feasible to stop a transmission which may be currently being or to be conducted on the shared channel.

The method may comprise determining in dependence on said indication if it is feasible to stop a transmission which may be currently being or to be conducted on the shared channel.

The method may comprise providing information from said physical apparatus to the medium access control apparatus indicating if it is feasible to stop a transmission which is currently being or to be conducted on the shared channel before the transmission of said packet data unit associated with data from that different logical channel is due to start.

The information may indicate if it is feasible to stop the transmission which is currently being or to be conducted on the shared channel and prepare for the transmission associated with the different logical channel before the transmission of said packet data unit associated with data from that different logical channel is due to start.

The information may indicate if the transmission which is currently being or to be conducted on the shared channel is comprising or relating to control information associated to at least one logical channel with priority higher than the different logical channel.

The shared channel may comprise one or more physical uplink channels.

The method may be performed in the physical apparatus.

According to an aspect, there is provided a method comprising: receiving an indication in a physical apparatus from a medium access control apparatus that data from a different logical channel is to be transmitted on a shared channel; and providing information from said physical apparatus to said medium access control apparatus indicating if it is feasible to stop a transmission which is currently being or to be conducted on the shared channel.

One or more features of the previous aspect may be provided in conjunction with this aspect.

According to another aspect, there is provided a medium control apparatus comprising means for: determining that data from a different logical channel is to be transmitted on a shared channel; and causing an indication to be provided to a physical apparatus that data from said different logical channel is to be transmitted on the shared channel before a packet data unit associated with data from that different logical channel is provided to the physical apparatus.

The indication may comprise information indicating that a current logical channel which is currently granted access to the shared channel is to stop.

The transmission which is currently being or to be conducted on the shared channel may be one of cancelled and delayed.

The means may be for determining that a different logical channel is associated with a higher priority than at least one current logical channel relating to the transmission which is currently being or to be conducted on the shared channel.

The indication may comprise information indicating that the different logic channel is associated with a higher priority.

A plurality of the transmissions may be currently being or to be conducted on the shared channel, and the indication may comprise information indicating which of the transmissions is to be stopped.

The indication may comprise information indicating when a transmission of said packet data unit associated with data from that different logical channel is to start.

The means may be for receiving from said physical apparatus information indicating if it is feasible to stop a transmission which is currently being or to be conducted on the shared channel.

The means may be for, in response to the information indicating that it is not feasible to stop the transmission which is currently being or to be conducted on the shared channel, stop processing of packet data units associated with that different logical channel.

The means may be for, in response to the information indicating that it is feasible to stop the transmission which is currently being or to be conducted on the shared channel, process the packet data units associated with that different logical channel, and deliver the packet data units to the physical apparatus.

The means may be for receiving from said physical apparatus information indicating if it is feasible to stop a transmission which is currently being or to be conducted on the shared channel before the transmission of said packet data unit associated with data from that different logical channel is due to start.

The information may indicate if it is feasible to stop the transmission which is currently being or to be conducted on the shared channel and prepare for the transmission associated with the different logical channel before the transmission of said packet data unit associated with data from that different logical channel is due to start.

The information may indicate if the transmission which is currently being or to be conducted on the shared channel is comprising or relating to control information associated to at least one logical channel with priority higher than the different logical channel.

The shared channel may comprise one or more physical uplink channels.

According to another aspect, there is provided a medium control apparatus comprising means for: determining that data from a different logical channel is to be transmitted on a shared channel; and receiving from said physical apparatus information indicating if it is feasible to stop a transmission which is currently being or to be conducted on the shared channel.

One or more features of the previous aspect may be provided in conjunction with this aspect.

According to another aspect, there is provided a physical apparatus comprising means for: receiving an indication from a medium access control apparatus that data from a different logical channel is to be transmitted on a shared channel; and subsequently receiving packet data units associated with that different logical channel.

The indication may comprise information indicating that a current logical channel which is currently being or to be conducted on the shared channel is to stop.

The transmission which is currently being or to be conducted on the shared channel may be one of cancelled and delayed.

The indication may comprise information indicating that the different logic channel is associated with a higher priority.

A plurality of the transmissions may be currently being or to be conducted on the shared channel and the indication may comprise information indicating which of the transmissions is to be stopped.

The indication may comprises information indicating when a transmission of said packet data unit associated with data from that different logical channel is to start.

The means may be for providing information to said medium access control apparatus indicating if it is feasible to stop a transmission which may be currently being or to be conducted on the shared channel.

The means may be for determining in dependence on said indication if it is feasible to stop a transmission which may be currently being or to be conducted on the shared channel.

The means may be for providing information to the medium access control apparatus indicating if it is feasible to stop a transmission which is currently being or to be conducted on the shared channel before the transmission of said packet data unit associated with data from that different logical channel is due to start.

The information may indicate if it is feasible to stop the transmission which is currently being or to be conducted on the shared channel and prepare for the transmission associated with the different logical channel before the transmission of said packet data unit associated with data from that different logical channel is due to start.

The information may indicate if the transmission which is currently being or to be conducted on the shared channel is comprising or relating to control information associated to at least one logical channel with priority higher than the different logical channel.

The shared channel may comprises one or more physical uplink channels.

The method may be performed in the physical apparatus.

According to another aspect, there is provided a physical apparatus comprising means for: receiving an indication from a medium access control apparatus that data from a different logical channel is to be transmitted on a shared channel; and providing information to said medium access control apparatus indicating if it is feasible to stop a transmission which is currently being or to be conducted on the shared channel.

One or more features of the previous aspect may be provided in conjunction with this aspect.

According to another aspect there is provided an medium access control apparatus comprising at least one processor and at least one memory including computer code for one or more programs, the at least one memory and the computer code configured, with the at least one processor, to cause the apparatus at least to: determine that data from a different logical channel is to be transmitted on a shared channel; and cause an indication to be provided to a physical apparatus that data from the said different logical channel is to be transmitted on the shared channel before a packet data unit associated with data from that different logical channel is provided to the physical apparatus.

The indication may comprise information indicating that a transmission which is currently being or to be conducted on the shared channel is to stop.

The transmission which is currently being or to be conducted on the shared channel may be one of cancelled and delayed.

The at least one memory and the computer code may be configured, with the at least one processor, to cause the apparatus to determine that a different logical channel is associated with a higher priority than at least one logical channel relating to the transmission which is currently being or to be conducted on the shared channel.

The indication may comprise information indicating that the different logic channel is associated with a higher priority.

A plurality of the transmissions may be currently being or to be conducted on the shared channel, and the indication may comprise information indicating which of the transmissions is to be stopped.

The indication may comprise information indicating when a transmission of said packet data unit associated with data from that different logical channel is to start.

The at least one memory and the computer code may be configured, with the at least one processor, to cause the apparatus to receive from said physical apparatus information indicating if it is feasible to stop a transmission which is currently being or to be conducted on the shared channel.

The information may indicate if it is feasible to stop the transmission which is currently being or to be conducted on the shared channel and prepare for the transmission associated with the different logical channel before the transmission of said packet data unit associated with data from that different logical channel is due to start.

The information may indicate if the transmission which is currently being or to be conducted on the shared channel is comprising or relating to control information associated to at least one logical channel with priority higher than the different logical channel.

The at least one memory and the computer code may be configured, with the at least one processor, to cause the apparatus to, in response to the information indicating that it is not feasible to stop the transmission which is currently being or to be conducted on the shared channel, stop processing of packet data units associated with that different logical channel.

The at least one memory and the computer code may be configured, with the at least one processor, to cause the apparatus to, in response to the information indicating that it is feasible to stop the transmission which is currently being or to be conducted on the shared channel, process the packet data units associated with that different logical channel, and deliver the packet data units to the physical apparatus.

The at least one memory and the computer code may be configured, with the at least one processor, to cause the apparatus to receive from said physical apparatus information indicating if it is feasible to stop a transmission which is currently being or to be conducted on the shared channel before the transmission of said packet data unit associated with data from that different logical channel is due to start.

The shared channel may comprises one or more physical uplink channels.

According to another aspect there is provided an medium access control apparatus comprising at least one processor and at least one memory including computer code for one or more programs, the at least one memory and the computer code configured, with the at least one processor, to cause the apparatus at least to: determine that data from a different logical channel is to be transmitted on a shared channel; and receive from said physical apparatus information indicating if it is feasible to stop a transmission which is currently being or to be conducted on the shared channel.

One or more features of the previous aspect may be provided in conjunction with this aspect.

According to another aspect there is provided a physical apparatus comprising at least one processor and at least one memory including computer code for one or more programs, the at least one memory and the computer code configured, with the at least one processor, to cause the apparatus at least to: receive an indication from a medium access control apparatus that data from a different logical channel is to be transmitted on a shared channel; and subsequently receive a packet data unit associated with that different logical channel.

The indication may comprise information indicating that a transmission which is currently being or to be conducted on the shared channel is to stop.

The transmission which is currently being or to be conducted on the shared channel may be one of cancelled and delayed.

The indication may comprise information indicating that the different logic channel is associated with a higher priority.

A plurality of the transmissions may be currently being or to be conducted on the shared channel and the indication may comprise information indicating which of the transmissions is to be stopped.

The indication may comprises information indicating when a transmission of said packet data unit associated with data from that different logical channel is to start.

The at least one memory and the computer code may be configured, with the at least one processor, to cause the apparatus to provide information to said medium access control apparatus indicating if it is feasible to stop a transmission which may be currently being or to be conducted on the shared channel.

The at least one memory and the computer code may be configured, with the at least one processor, to cause the apparatus to determine in dependence on said indication if it is feasible to stop a transmission which may be currently being or to be conducted on the shared channel.

The at least one memory and the computer code may be configured, with the at least one processor, to cause the apparatus to provide information to the medium access control apparatus indicating if it is feasible to stop a transmission which is currently being or to be conducted on the shared channel before the transmission of said packet data unit associated with data from that different logical channel is due to start.

The information may indicate if it is feasible to stop the transmission which is currently being or to be conducted on the shared channel and prepare for the transmission associated with the different logical channel before the transmission of said packet data unit associated with data from that different logical channel is due to start.

The information may indicate if the transmission which is currently being or to be conducted on the shared channel is comprising or relating to control information associated to at least one logical channel with priority higher than the different logical channel.

The shared channel may comprises one or more physical uplink channels.

According to another aspect there is provided a physical apparatus comprising at least one processor and at least one memory including computer code for one or more programs, the at least one memory and the computer code configured, with the at least one processor, to cause the apparatus at least to: receive an indication from a medium access control apparatus that data from a different logical channel is to be transmitted on a shared channel; and provide information to said medium access control apparatus indicating if it is feasible to stop a transmission which is currently being or to be conducted on the shared channel.

One or more features of the previous aspect may be provided in conjunction with this aspect.

According to an aspect there is provided an medium access control apparatus comprising circuitry configured to: determine in that data from a different logical channel is to be transmitted on a shared channel; and cause an indication to be provided to a physical apparatus that data from the said different logical channel is to be transmitted on the shared channel before a packet data unit associated with data from that different logical channel is provided to the physical apparatus.

The indication may comprise information indicating that a transmission which is currently being or to be conducted on the shared channel is to stop.

The transmission which is currently being or to be conducted on the shared channel may be one of cancelled and delayed.

The circuitry may be configured, with the at least one processor, to cause the apparatus to determine that a different logical channel is associated with a higher priority than at least one logical channel relating to the transmission which is currently being or to be conducted on the shared channel.

The indication may comprise information indicating that the different logic channel is associated with a higher priority.

A plurality of the transmissions may be currently being or to be conducted on the shared channel, and the indication may comprise information indicating which of the transmissions is to be stopped.

The indication may comprise information indicating when a transmission of said packet data unit associated with data from that different logical channel is to start.

The circuitry may be configured, to cause the apparatus to receive from said physical apparatus information indicating if it is feasible to stop a transmission which is currently being or to be conducted on the shared channel.

The circuitry may be configured, in response to the information indicating that it is not feasible to stop the transmission which is currently being or to be conducted on the shared channel, stop processing of packet data units associated with that different logical channel.

The circuitry may be configured, to cause the apparatus to, in response to the information indicating that it is feasible to stop the transmission which is currently being or to be conducted on the shared channel, process the packet data units associated with that different logical channel, and deliver the packet data units to the physical apparatus.

The circuitry may be configured to receive from said physical apparatus information indicating if it is feasible to stop a transmission which is currently being or to be conducted on the shared channel before the transmission of said packet data unit associated with data from that different logical channel is due to start.

The information may indicate if it is feasible to stop the transmission which is currently being or to be conducted on the shared channel and prepare for the transmission associated with the different logical channel before the transmission of said packet data unit associated with data from that different logical channel is due to start.

The information may indicate if the transmission which is currently being or to be conducted on the shared channel is comprising or relating to control information associated to at least one logical channel with priority higher than the different logical channel.

According to an aspect there is provided a physical apparatus comprising circuitry configured to: receive an indication s from a medium access control apparatus that data from a different logical channel is to be transmitted on a shared channel; and subsequently receiving packet data units associated with that different logical channel.

The indication may comprise information indicating that a transmission which is currently being or to be conducted on the shared channel is to stop.

The transmission which is currently being or to be conducted on the shared channel may be one of cancelled and delayed.

The indication may comprise information indicating that the different logic channel is associated with a higher priority.

A plurality of the transmissions may be currently being or to be conducted on the shared channel and the indication may comprise information indicating which of the transmissions is to be stopped.

The indication may comprises information indicating when a transmission of said packet data unit associated with data from that different logical channel is to start.

The circuitry may be configured to provide information from said physical apparatus to said medium access control apparatus indicating if it is feasible to stop a transmission which may be currently being or to be conducted on the shared channel.

The circuitry may be configured to determine in dependence on said indication if it is feasible to stop a transmission which may be currently being or to be conducted on the shared channel.

The circuitry may be configured to provide information to the medium access control apparatus indicating if it is feasible to stop a transmission which is currently being or to be conducted on the shared channel before the transmission of said packet data unit associated with data from that different logical channel is due to start.

The information may indicate if it is feasible to stop the transmission which is currently being or to be conducted on the shared channel and prepare for the transmission associated with the different logical channel before the transmission of said packet data unit associated with data from that different logical channel is due to start.

The information may indicate if the transmission which is currently being or to be conducted on the shared channel is comprising or relating to control information associated to at least one logical channel with priority higher than the different logical channel.

The shared channel may comprises one or more physical uplink channels.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which.

DETAILED DESCRIPTION OF THE FIGURES

In the following certain embodiments are explained with reference to communications devices capable of communication via a wireless cellular system and communication systems serving such communications devices. Before explaining in detail the exemplifying embodiments, certain general principles of a wireless communication system, access systems thereof, and communications devices are briefly explained with reference to FIGS. 1 and 2 to assist in understanding the technology underlying the described examples.

Figure 1:
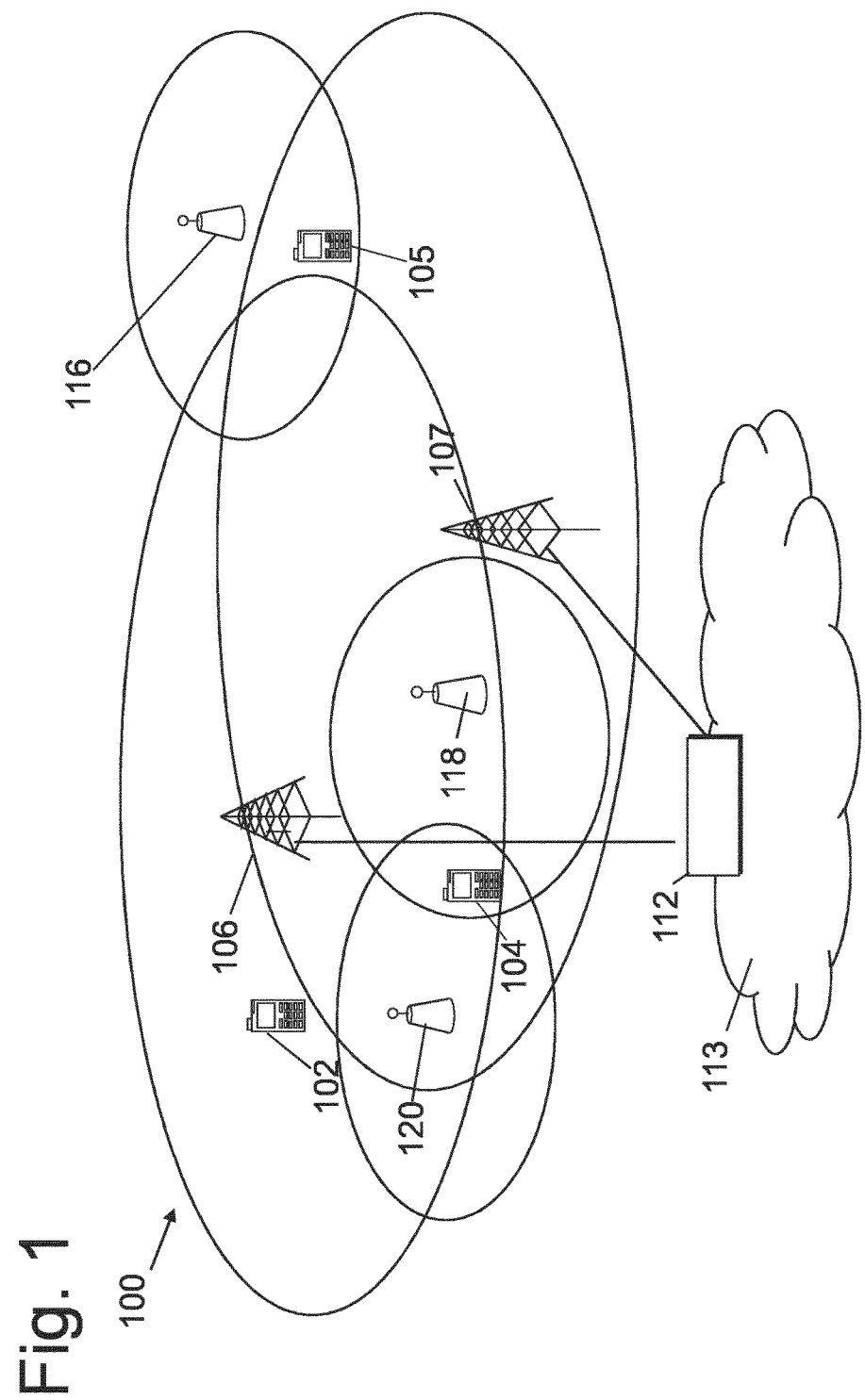
FIG. 1 shows a schematic representation of a communication system.

Reference is made to FIG. 1 which shows an example system 100 in which some embodiments may be provided. The system may be a wireless communications system. In a wireless communication system 100, such as that shown in FIG. 1, communication devices or user equipment (communication device) 102, 104, 105 are provided. Some examples of communications devices are discussed below and as used in this document the term communication device is intended to cover any one or more of those devices and/or any other suitable device.

The communication devices may be provided wireless access via at least one base station (or similar wireless transmitting and/or receiving node or point).

In FIG. 1, there are base stations 106 and 107 which serve relatively large cells. Smaller base stations 116, 118 and 120 may also be provided. The smaller base stations 116, 118 and 120 may be pico or femto level base stations or the like. In some embodiments, the smaller base stations may not be provided.

One or more of the base stations may communicate with a network 113 via one or more network functions 112. One or more of the base stations may communicate with the network via one or more other base stations. For example one or more smaller base stations may communicate with a network via one or more of the large base stations.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One 3GPP based development is often referred to as the long term evolution (LTE) of the Universal Mobile Telecommunications System (UMTS) radio-access technology. Some developments of LTE are referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs). Another example of a suitable communications system is the 5G or New Radio (NR) concept. Base stations of NR systems may be known as next generation Node Bs (gNBs). The base station may be an ng-eNB. Other examples of radio access system comprise those provided by base stations of systems that are based on technologies such as wireless local area network (WLAN) and/or WiMAX (Worldwide Interoperability for Microwave Access). A base station can provide coverage for an entire cell or similar radio service area. Some examples of access points or base stations have been mentioned and as used in this document the term base station is intended to cover any one or more of those devices and/or any other suitable device.

Some aspects of one or more standards may relate to Industrial Internet of Things (IIoT) and/or ultra-reliable low-latency communications (URLLC) enhancements. The aspects may be, for example, for use cases demanding stringent reliability and/or latency targets, e.g. time sensitive network (TSN) use cases.

Figure 2:
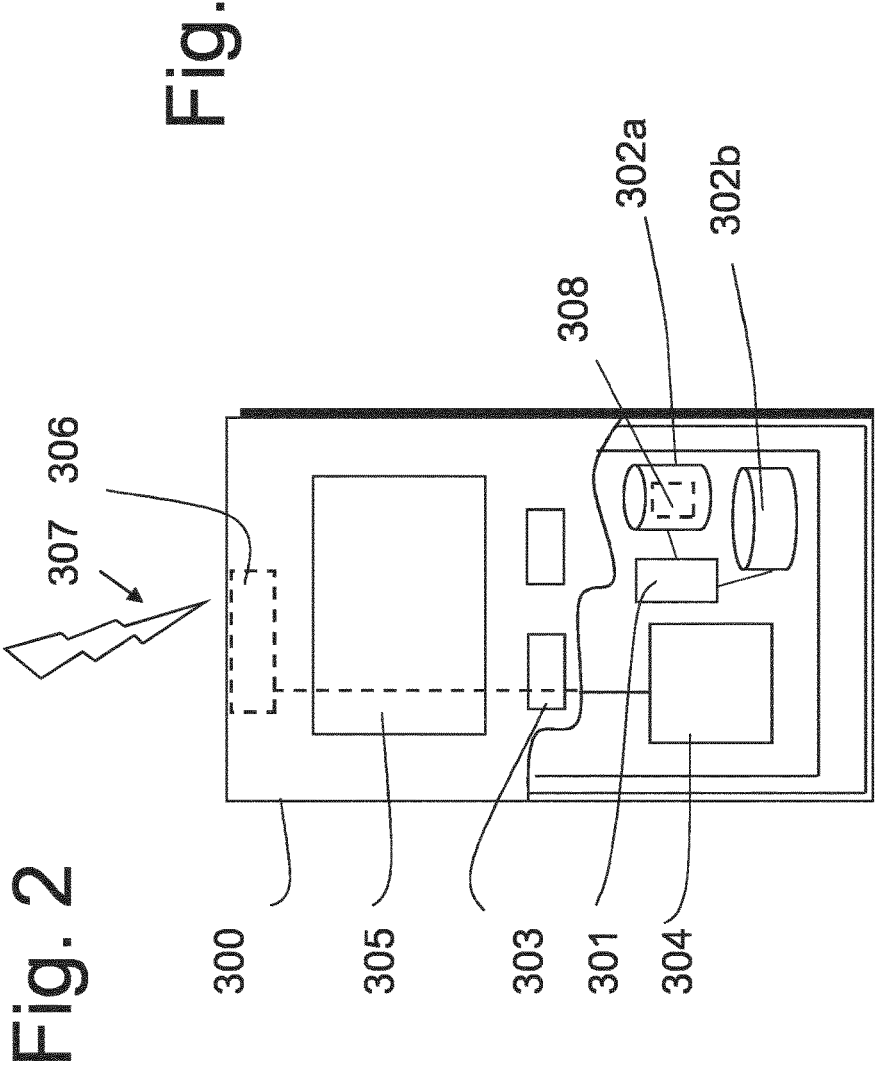
FIG. 2 shows a schematic representation of a communications device.

FIG. 2 illustrates an example of a communications device 300, such as the wireless communications device 102, 104 or 105 shown on FIG. 1. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like. The communications device may be incorporated within another device.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the mobile device. In some embodiments, a plurality of transceivers may be provided by the transceiver apparatus.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302b.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

Some embodiments may be used for cases wherein the communication device has to process two or more traffics with different requirements concurrently or in an overlapping manner.

Figure 6:
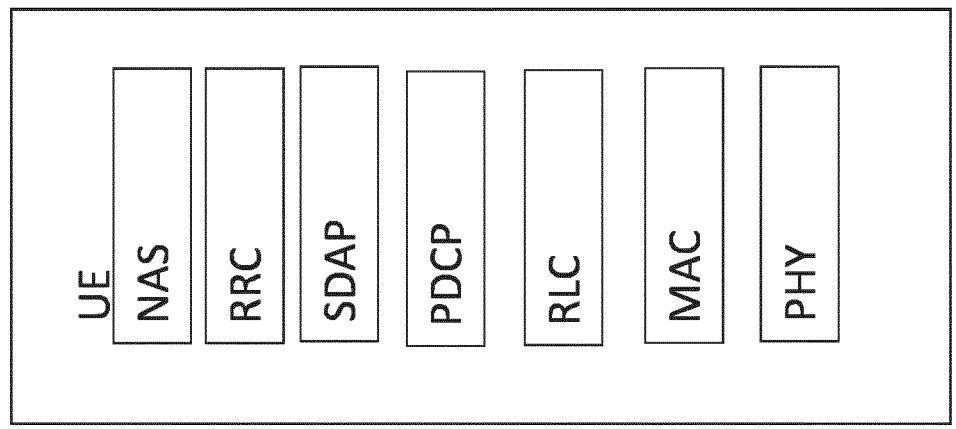
FIG. 6 shows control plane stack of a communications device.

FIG. 6 shows a schematic representation of a control plane stack of a communication device. This may be for use in a 5G system or any other suitable system.

The communication device may comprise one or more of a physical (PHY) layer, a medium access (MAC) layer, a radio link control (RLC) layer, a packet data convergence protocol (PDCP) layer, a service data adaptation protocol (SDAP) layer, a radio resource control (RRC) layer and a non-access stratum (NAS) layer.

Some embodiments may be provided by the MAC layer and/or the PHY layer. The MAC layer and the PHY layer may be implemented in hardware. In some embodiments, the MAC layer may be implemented by one or more processors, one or more memories and computer code which runs on the one or more processors. The MAC layer may be implemented by one or more integrated circuits.

In some embodiments, the PHY layer may be implemented by one or more processors, one or more memories and computer code which runs on the one or more processors. The PHY layer may be implemented by one or more integrated circuits.

The PHY layer and the MAC layer may be implemented on common hardware or different hardware. The PHY layer may be implemented by an apparatus. The MAC layer may be implemented by an apparatus. The common apparatus may provide the PHY apparatus and the MAC apparatus. In other embodiments, different apparatus may provide the PHY apparatus and the MAC apparatus.

The MAC layer may provide a mapping between logical channels and transport channels. The MAC layer may handle resource allocation. The MAC layer may handle construction of a data packet to be further processed by the PHY layer, by multiplexing data from one or more logical channels in accordance to logical channel prioritization parameters. The MAC layer may provide the function of multiplexing/demultiplexing of MAC SDUs belonging to one or different logical channels into/from transport blocks (TB) delivered to/from the physical layer on transport channels. The MAC layer may provide scheduling information reporting. The MAC layer may provide error correction, for example through HARQ (hybrid automatic repeat request. There may be one HARQ entity per cell in case of CA (carrier aggregation). The MAC layer may deal with priority handling between terminals by means of dynamic scheduling. The MAC layer may deal with priority handling between logical channels of one terminal by means of logical channel prioritisation. The MAC layer may deal with padding.

It has been suggested that the MAC layer handles prioritization between overlapping resources of one terminal. This may be used for example in Industrial IoT applications.

The PHY layer interfaces the wireless channel with the MAC layer and upper layers. It may transmit the data packet constructed by the MAC layer over the wireless channel medium after additional processing. The PHY layer may conduct error correction functionality to enable error correction at a receiver. The PHY layer may conduct modulation and/or demodulation functions. The PHY layer may conduct mapping between data and physical radio resources and between transport and physical channels.

Some embodiments may be used where there are configured grants CG and/or dynamic grants DG.

Provisioning radio resources that can be used by delay-sensitive traffics has been proposed approach introduced in NR for URLLC. Uplink transmission based on CG may reduce potential latency caused by SR/BSR (scheduling request/buffer status report) procedures. With CG, uplink resources may be pre-allocated and occur in a periodic manner, and the communications device may utilize these pre-allocated resources for uplink transmission whenever it is available without needing to wait for a scheduling grant from the gNB. In some situations, one single CG can be activated in each BWP (bandwidth part) per serving cell. In some situations, two or more active CGs may be supported per BWP.

The CG supported by 5G NR can be classified into Type-1 and Type-2. Type-1 CG is solely configured by the RRC and is activated as soon as the RRC configuration is completed. Type-2 CG is configured by the RRC, but it is activated/deactivated (along with remaining scheduling information) by L1 signalling dynamically. In both cases, the gNB may assign a set of parameters such as one or more of MCS (modulation and coding scheme), TBS (transport block size), resource size/timing and power-related settings to each grant, so the communications device can use these grants properly.

A DG, is an uplink grant that assigns to a communications device by the base station spontaneously based on the SR/BSR provided by the UE.

Due to the possibility of configuring a plurality of active configured grants CGs and/or with dynamic grants DGs assigned by the base station spontaneously based on the BSR (buffer status report) from the communication device, some of these transmission opportunities provided by different configured and/or dynamic grants may overlap in time.

The communications device may typically only transmit one PUSCH (physical uplink shared channel) per serving cell at a time. In this scenario, the communication device may have to conduct prioritization among the colliding grants to determine which one of these conflicting transmission opportunities should proceed. The other transmissions would need to be dropped. This may require the stopping and/or cancelling of the processing and/or transmission of MAC PDUs (packet data units) corresponding to the dropped grants. Alternatively, it may require puncturing the ongoing transmission related to deprioritized grant.

It has been proposed in the context of 5G Industrial Internet of things to investigate different scenarios involving different types of grants.

For collisions between a DG and a CG or for collisions between two or more active CGs, the MAC may conduct grant prioritization based on one or more of the priority of LCHs (logical channel) mapped to each of the colliding grants and LCH mapping restrictions.

Some embodiments may address resource conflicts between dynamic grant (DG) and configured grant (CG) PUSCH in a communications device.

Some embodiments may address conflicts involving two or more CGs. Each CG corresponds to ta PUSCH in some embodiments. A conflict may mean that the PUCSCH of these two CGs overlap in time.

Some embodiments may specify PUSCH grant prioritization based on one or more of LCH priorities and LCP (logical channel prioritization) restrictions for the cases where the MAC layer prioritizes the grant.

Some embodiments may address UL data/control and control/control resource collision by specifying a method to address resource collision between SR associated with high-priority traffic and uplink data of lower-priority traffic for the cases where MAC determines the prioritization. Some embodiments may specify prioritization and/or multiplexing behaviour among HARQ-ACK/SR/CSI and PUSCH for traffic with different priorities, for example including the cases with UCI on PUCCH and UCI on PUSCH.

With intra-communication device uplink prioritization, the MAC layer can compare the priority of LCHs to be mapped to a plurality of conflicting grants and proceed with the grant that carries the traffic from the highest priority LCH. In particular, if MAC has already processed one of the conflicting grants and generated the MAC PDU for it, pre-emption at the PHY might be needed to stop transmission of this MAC PDU if the MAC identifies a higher priority grant in the overlapping time resource. The stopping of the transmission may comprises cancelling the transmission or delaying the transmission, for example by puncturing. Pre-emption of a previous channel may comprise one or more of cancelling, and puncturing of the previous channel. Puncturing is such that the stopped transmission can be continued after the prioritized data transmission is finalized or completed.

Figure 4A:
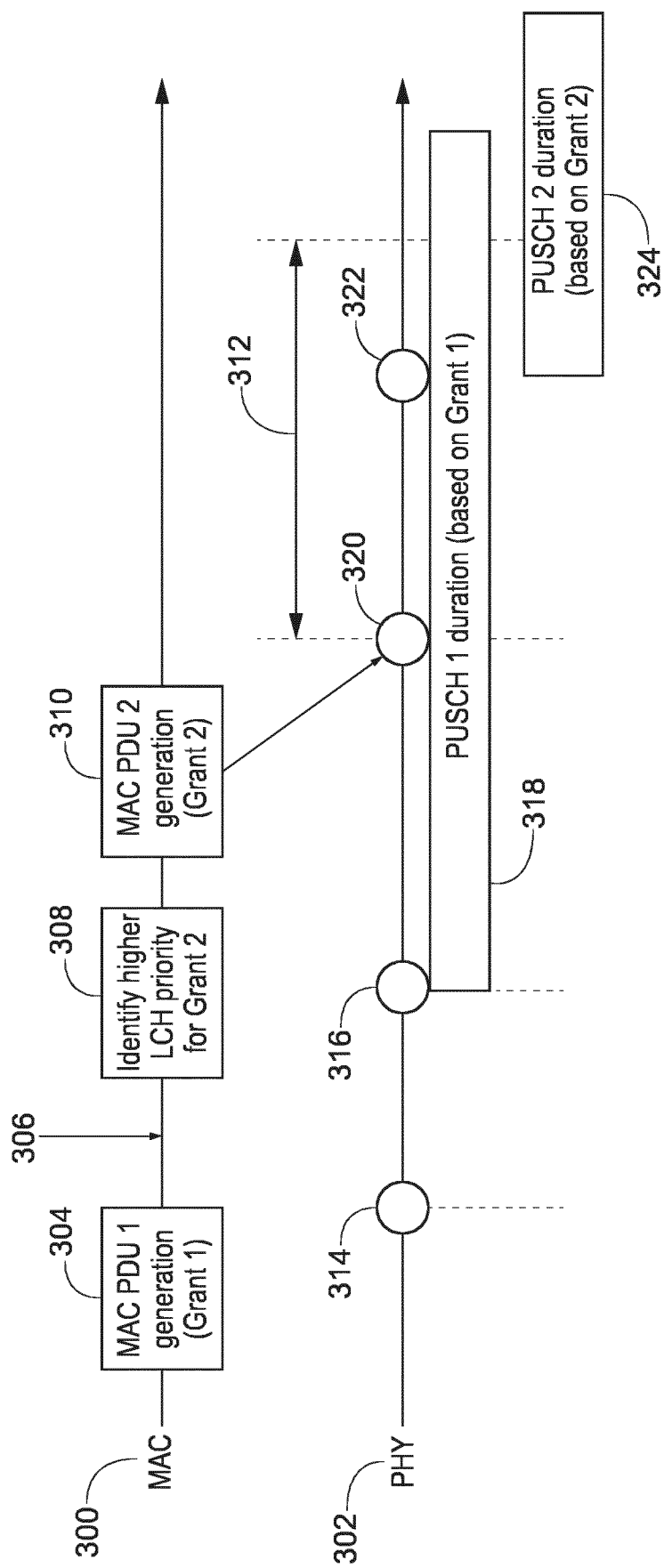
FIG. 4a shows a schematic representation of issues relating to insufficiency of processing time for a PHY layer.

The MAC may decide whether to cancel the earlier PUSCH, or abandon the later grant, depending on the priorities of LCHs which are to be mapped to the latest available grant. There may be some constraints of processing capability (for example due to the hardware and/or software configuration in the PHY layer). For example, it may take some time for the PHY to cancel the on-going PUSCH. The time period required to terminate an on-going PUSCH in the PHY layer may not be negligible. Thus, there might be a situation where the earlier PUSCH cannot be fully cancelled (pre-empted) before the new PUSCH (corresponding to the prioritized grant) is supposed to start. This situation is shown in FIG. 4a which shows a time line for the MAC layer 300 and the PHY layer 302.

At time 304, a first MAC PDU is generated, this being associated with a first grant, Grant 1.

This MAC PDU associated with the first grant is provided at time 314 to the PHY layer which starts the processing of that MAC PDU.

At time 306, traffic with a higher priority is received at the MAC layer.

At time 308, the MAC layer identifies a higher LCH priority for a second grant, Grant 2.

At time 310 the MAC layer generates the second MAC PDU associated with the second grant, Grant 2.

Meanwhile the PHY layer is at time 316 starting the PUSCH for the MAC PDU of the first grant. This is taking place at more or less the same time as time 308 in this example.

As indicated by reference 318 the PUSCH for the first grant, PUSCH 1 starts.

At time 320, the PHY layer receives the MAC PDU associated with the second grant from the MAC. The PHY layer will start pre-empting the MAC PDU associated with the first grant and start processing the MAC PDU associated with the second grant.

At time 324 (or time 322) the PUSCH of the second grant, PUSCH 2 is supposed to start.

Arrow 312 indicates the time required by the PHY to complete the pre-emption of the MAC PDU associated with the first grant and to prepare for the sending of the data associated with the second grant. Arrow 312 starts at time 320 and ends after the PUSCH associated with the second grant is supposed to start. In this case there is insufficient PHY processing time to cancel the PUSCH associated with the first grant and prepare PUSCH associated with the second grant.

The PHY may need to process the new PUSCH if it overrides the previous PUSCH, which may, e.g. involve UCI (uplink control information) multiplexing onto PUSCH. Therefore, it is desirable for the PHY to become aware of the need for PUSCH cancellation/stopping/puncturing as early as possible. The cancelling may be to stop the transmission on the PUSCH. This is so that the PHY can know in advance which PUSCH will be used so that UCI encoding (based on joint coding or rate matching) can be carried out properly. In this way, the UCI may be prepared without a potential additional delay or the need to re-process the UCI information for the new PUSCH. Hence, it is desirable in some embodiments, for the PHY layer to get notified by the MAC layer regarding the prioritization results in a timely manner, in order to ensure that intra-communication device prioritization can be undertaken properly.

Some embodiments may allow the PHY layer to acquire the information relating to MAC layer decisions on grant prioritization in a timely manner.

Some embodiments may be used in a situation where the MAC layer selects the grant in a sequential manner, for example, the MAC layer generates the PDU for the first grant. The MAC layer will determine whether to generate the PDU for a second grant (and pre-empt the PDU for the first grant). This may depend on whether the data to be conveyed by the second grant has higher priority than that to be conveyed by the first grant. The priority may be determined based on a priority associated to LCHs from which the data comes.

In some embodiments, the MAC layer may send an indication to the PHY layer as soon as it identifies higher priority data that is to be conveyed by a subsequent conflicting grant. The indication may notify the PHY layer that the on-going PDU (associated with the first grant) is to be pre-empted, so that the PHY layer can begin the preparation of such pre-emption even before the new PDU associated with the second grant is received from the MAC layer.

In some embodiments, a method is performed by the MAC layer of a communication device. The MAC layer may identify if a grant will be carrying higher priority data than the on-going PUSCH. The MAC layer may determine if a notification should be sent to PHY to initialize preparation of PUSCH cancellation.

In some embodiments, a method may be performed by the PHY layer of a communication device. The PHY layer may receive a notification from the MAC layer indicating that the on-going PUSCH will be overridden by another MAC PDU. The PHY layer may initialize preparation of the PUSCH for the second grant.

In some embodiments a cross-layer message, is transmitted from the MAC layer to the PHY layer. This message may indicate that the previously scheduled and/or on-going PUSCH is to be pre-empted. Based on this indication the PHY layer may initialize preparations related to cancellation of an on-going PUSCH and transmission of data associated with a new grant. In some embodiments, the indication is sent right after MAC determines that data for the new grant has higher priority.

In some embodiments a cross-layer message is transmitted from the PHY layer to the MAC layer, which conveys information relating to the feasibility of cancellation of an on-going PUSCH.

Figure 4B:
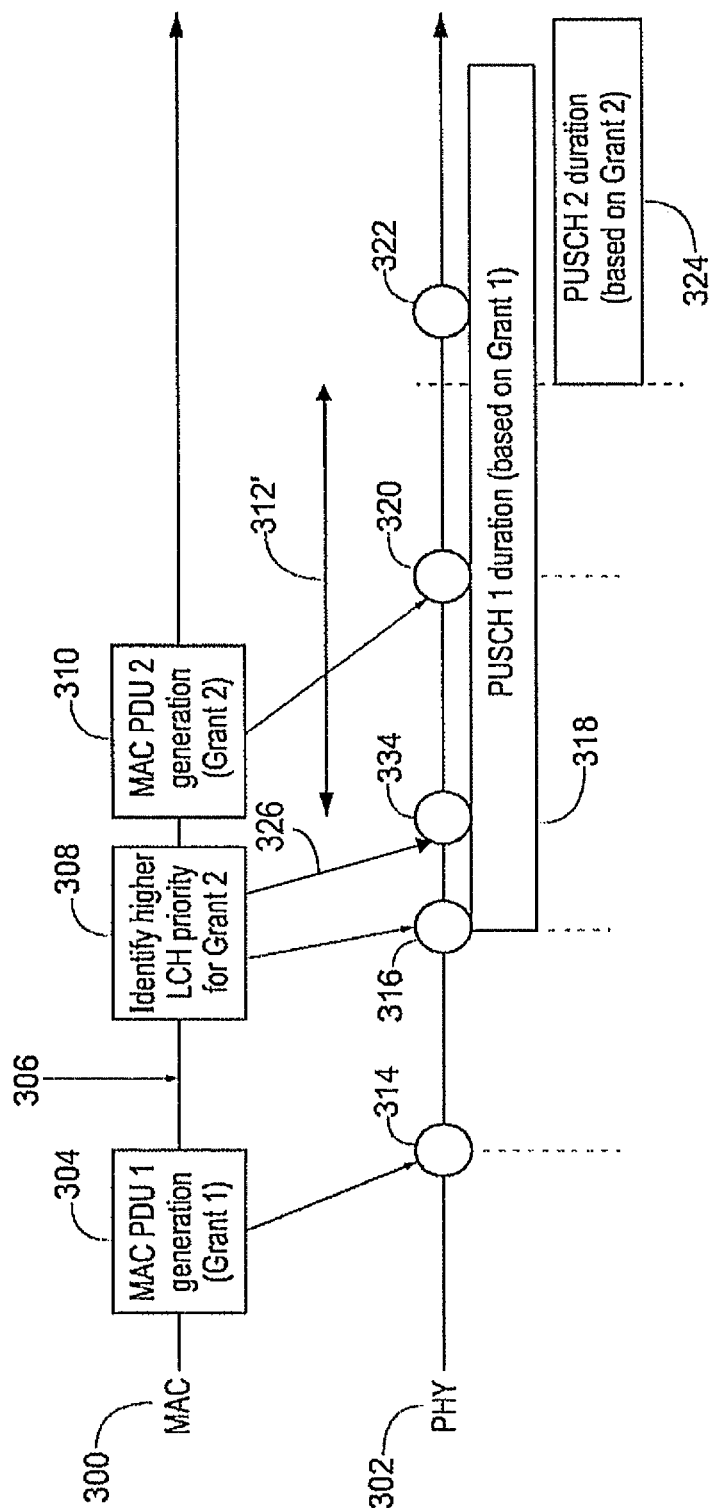
FIG. 4b shows a schematic representation of a method where a notification is provided from a MAC layer to the PHY layer.

Reference is made to FIG. 4b which shows a time line for the MAC layer 300 and the PHY layer 302 for some embodiments.

At time 304, a first MAC PDU is generated, this being associated with a first grant, Grant 1.

This MAC PDU associated with the first grant is provided at time 314 to the PHY layer which starts the processing of that MAC PDU.

At time 306, traffic with a higher priority is received at the MAC layer.

At time 308, the MAC layer identifies a higher LCH priority for a second grant, Grant 2. The MAC layer will provide an indication 326 of this to the PHY layer before the MAC layer generates the second MAC PDU associated with the second grant.

At time 310 the MAC layer generates the second MAC PDU associated with the second grant, Grant 2.

Meanwhile the PHY layer is at time 316 starting the PUSCH for the MAC PDU of the first grant. This is taking place at more or less the same time as time 308 in this example.

As indicated by reference 318 the PUSCH for the first grant, PUSCH 1 starts.

At time 334, the PHY layer will receive the indication from the MAC layer and can start the pre-emption of the MAC PDU associated with the first grant. The PHY layer will start pre-empting the MAC PDU associated with the first grant.

At time 320, the PHY layer receives the MAC PDU associated with the second grant from the MAC and starts processing that received PDU.

At time 324 the PUSCH for the second grant, PUSCH 2 starts.

Arrow 312' indicates the time required by the PHY to complete the pre-emption of the MAC PDU associated with the first grant and to prepare for the sending of the data associated with the second grant. Arrow 312' starts at time 334 and ends before the starting of the PUSCH associated with the second grant.

As compared to FIG. 4a, where the PHY layer only begins the preparation of PUSCH cancellation after a new MAC PDU associated with the second grant is received from MAC layer, the method shown in FIG. 4b allows the PHY layer to gain an additional time budget for preparation of PUSCH cancellation. The MAC layer may notify the PHY layer as soon as the need of PUSCH cancellation is identified even before the new MAC PDU is generated, e.g. based on determining the arrival of the higher priority traffic and suitability of a conflicting grant for such traffic. This may be performed for example as part of the procedures related to LCP.

In some embodiments, based on such a pre-PDU-delivery of a PUSCH-cancellation notification, the PHY may be able to take one or more of the following actions earlier:

Initialize preparation of PUSCH cancellation;
Initialize processing of the new grant;
Initialize UCI preparation and multiplexing into the new PUSCH (if needed); and
Determine that the PHY layer is unable to cancel the previous PUSCH and provide an indication to the MAC layer.

This may minimize the occurrence of a situation where the PHY layer is unable to transmit the new PUSCH due to insufficient time to cancel the previous PUSCH and process the new grant.

Moreover, as well as or instead of the notification that assists the PHY layer to take actions of the PUSCH cancellation earlier, the MAC layer may alternatively or additionally provide one or more provide additional information along with such an indication. For examples, the MAC may also inform the following:

In case the PHY layer is processing more than one PUSCH, the MAC may indicate which on-going PUSCHs will be cancelled.

Information about the new grant which is going to be prioritized (e.g. starting time of the new PUSCH), so that PHY layer can evaluate how much time is available for it to process the PUSCH cancellation and/or process new grant.

The time required by the MAC layer to generate the new PDU (which may vary according to one or more criteria such as the TBS etc.). This may provide the PHY layer with some information about how quickly it should complete PUSCH cancellation.

Figure 4C:
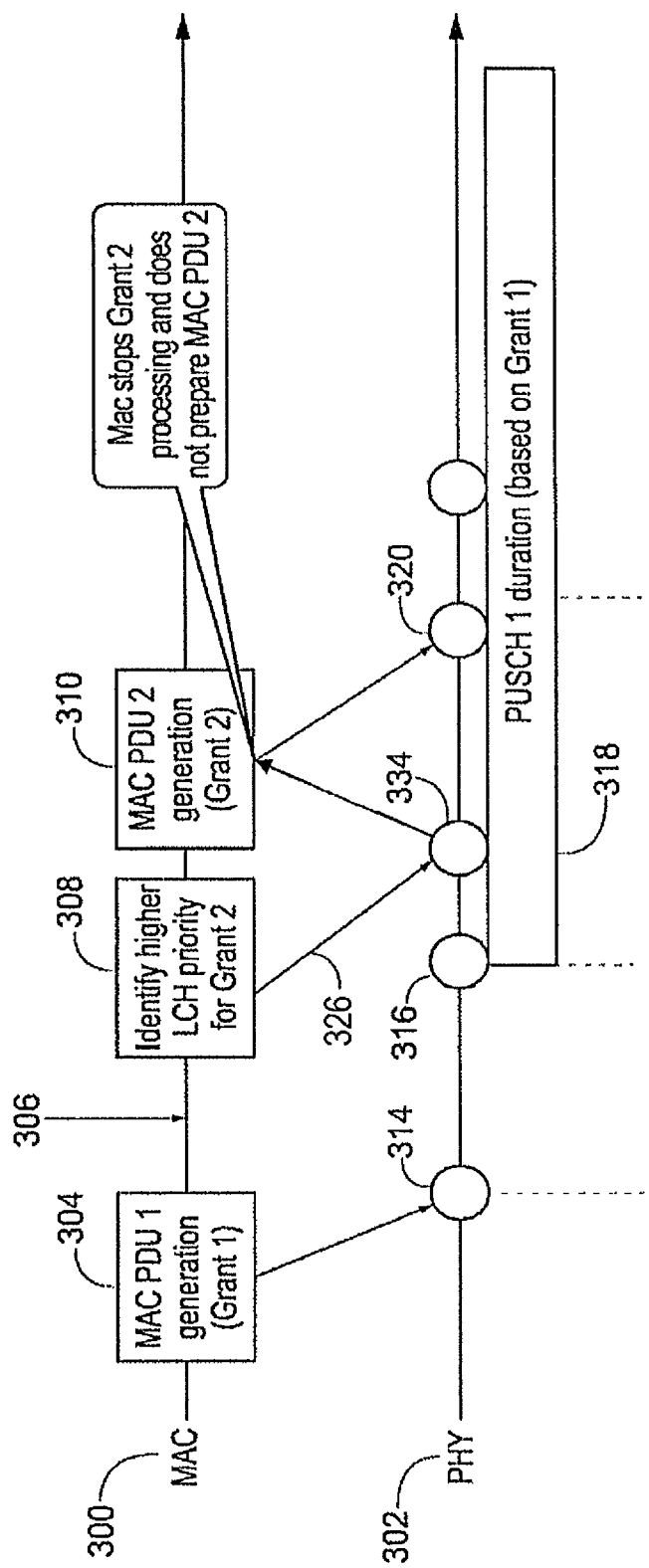
FIG. 4c shows a schematic representation of a method where feedback to the notification is provided to the MAC layer from the PHY layer.

Once the indication from the MAC layer and/or the information relating to time budget for PUSCH cancellation are received by the PHY layer, the PHY layer may evaluate whether PUSCH cancellation is feasible. In some cases, the PHY may find that it is not able to complete PUSCH cancellation within time. This may for example be because the starting time of the new PUSCH is too soon and/or due to hardware constraints related to physical components of the communication device. These physical components may be one or more of a transmitter, antennas, filters and/or the like. Thus, the PHY layer may send a feedback to the MAC layer regarding the feasibility of PUSCH cancellation. Based on this feedback, the MAC layer may determine if a new MAC PDU corresponding to the later grant should be generated based on the feedback from the PHY layer. This is shown in FIG. 4c which shows a time line for the MAC layer 300 and the PHY layer 302 for some embodiments.

At time 304, a first MAC PDU is generated, this being associated with a first grant, Grant 1.

This MAC PDU associated with the first grant is provided at time 314 to the PHY layer which starts the processing of that MAC PDU.

At time 306, traffic with a higher priority is received at the MAC layer.

At time 308, the MAC layer identifies a higher LCH priority for a second grant, Grant 2. The MAC layer will provide an indication 326 of this to the PHY layer before the MAC layer generates the second MAC PDU associated with the second grant.

Meanwhile the PHY layer is at time 316 starting the PUSCH for the MAC PDU of the first grant. This is taking place at more or less the same time as time 308 in this example.

As indicated by reference 318 the PUSCH for the first grant, PUSCH 1 starts.

At time 334, the PHY layer will receive the indication from the MAC layer and will determine if the cancellation of the PUSCH for the first grant is feasible within the required time. This may use the information received from the MAC layer such as previously discussed.

The PHY may only provide a positive indication in case it can stop the previous transmission and process the new one on time (i.e. before the start time of the grant). A negative indication from PHY is sent in case it is not able to stop the previous transmission and process new one on time.

An indication of the feasibility of the pre-emption or cancellation of the PUSCH for the first grant is provided to the MAC layer at time 310 or thereabouts. At time 310 the MAC layer would normally generate the second MAC PDU associated with the second grant, Grant 2. However, the MAC layer will in response to receiving the information that it is not possible to pre-empt the PUSCH for the first channel stop processing and does not prepare the MAC PDU or in case it was already prepared, it may decide not to forward it to PHY layer for transmission.

In some embodiments, the indication of the feasibility will be provided to indicate if the cancellation or pre-emption is feasible or not. In some embodiments, the indication is only provided to the MAC layer where the cancellation or pre-emption is not feasible. In other embodiments, the indication is only provided to the MAC layer where the cancellation or pre-emption is feasible.

The indication of feasibility may indicate if the transmission which is currently being or to be conducted on the shared channel is comprising or relating to control information associated with the logical channel of the first grant with priority higher than the logical channel associated with the second grant.

This may allow the PHY to advise the MAC layer if the on-going transmission has uplink control information (UCI) relating to one or more even higher priority logical channels (e.g. via UCI multiplexing in PUSCH) than the new packet that MAC layer is planning to deliver via the second grant. If that is the case, the MAC layer may stop further processing and refrain from interrupting the on-going transmission. Therefore, even if the processing time allows, the potential control information relating to even higher priority logical channel may also be considered. In some embodiments, whether such control information has been multiplexed into PUSCH may not be visible to the MAC layer.

At time 320, the PHY layer in this example does not receive the MAC PDU associated with the second grant from the MAC. This is because there is insufficient time to cancel the PUSCH of the first grant.

Some embodiments may have an advantage that there may be higher chances that an on-going transmission carrying lower priority data can be pre-empted by the new grant carrying higher priority data.

Some embodiments may have an advantage of avoiding the situation where lower priority data may pre-empt higher priority data. This situation may arise where priority is associated with grants instead of priority associated with data.

In some embodiments, due to the PHY to MAC indication, unnecessary processing in the MAC layer may be avoided in the case that the PHY layer is not able to cancel the ongoing grant and/or prepare for transmission related to a new grant. This may for example be due to time constraints.

In some embodiments, due to the PHY to MAC indication about infeasibility of pre-emption, the issue of non-sending the generated MAC PDU is avoided, since MAC layer will not prepare MAC PDU and fetch data from transmission buffer when such is received.

Figure 5:
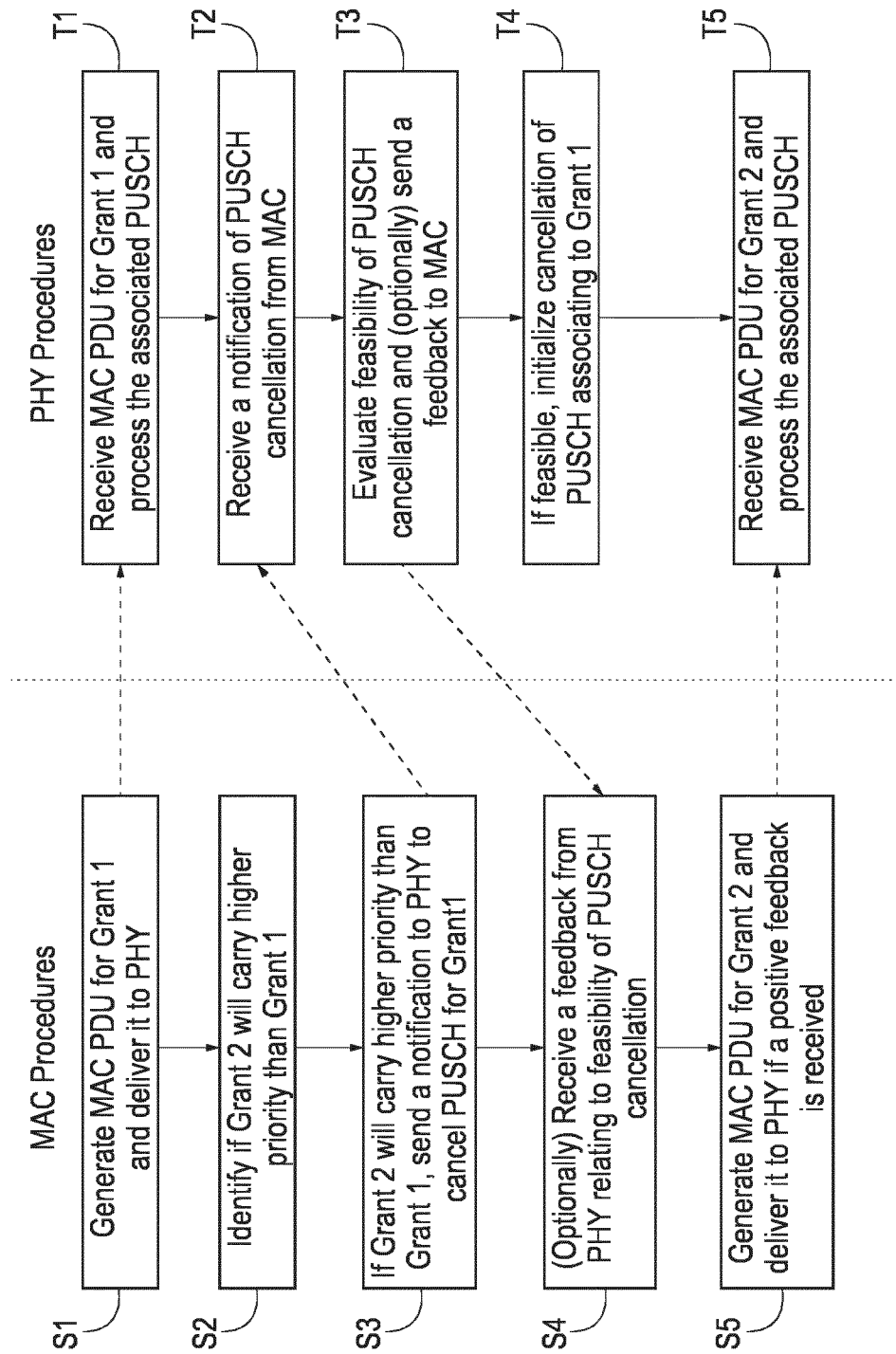
FIG. 5 shows a method flow performed in the PHY layer and the MAC layer in some embodiments.

Reference is made to FIG. 5 which shows the method of the MAC and PHY layers of some embodiments. The method performed in the MAC layer is shown on the left hand side and the method performed in the PHY layer is shown on the right hand side.

The steps performed in the MAC layer will be first described.

In step S1, a MAC PDU is generated for a first grant, Grant 1 and this is delivered to the PHY layer. (This may provide an input which is used in step T1 in the PHY layer as will be described later).

In step S2, it is determined if a second grant, Grant 2, will be associated with a higher priority.

In step S3, when it is determined that the second grant, Grant 2, is associated with a higher priority than that associated with the first grant, Grant 1, a notification is set to the PHY the cancel the PUSCH associated with the first grant, Grant 1. (This may provide an input which is used in step T2 in the PHY layer as will be described later). It should appreciated that it may be indicated that cancellation is related to higher priority data being associated with a new grant and optionally which grant this is if there are a plurality of overlapping grants. The information provided may comprise at least information about when the new PUSCH is starting which may be used by the PHY to evaluate whether it has sufficient time. On the other hand if there is only a single overlapping grant, then the PHY layer will know that information already, so this information may be optional in this scenario.

Optionally, in step S4, feedback may be received from the PHY relating to whether or not it is feasible to cancel the PUSCH and/or prepare or process the PUSCH related to the new grant. (The input used in this step may be provided by step T3 in the PHY layer as will be described later).

In step S5, a MAC PDU for the second grant, Grant 2, is generated and delivered to the PHY if feedback that it is feasible to cancel the PUSCH associated with the first grant, Grant 1. (This may provide an input which is used in step T5 in the PHY layer as will be described later).

The steps performed in the PHY layer will now be described.

In step T1, a MAC PDU is received for a first grant, Grant 1 and this is delivered to the PHY layer.

In step T2, a notification is received by the PHY layer from the MAC layer to cancel the PUSCH associated with the first grant, Grant 1.

In step T3, the PHY layer determines whether or not it is feasible to cancel the PUSCH associated with the first grant and optionally provides feedback on this to the MAC layer. This may use the information discussed in step S3 previously. It may be determined if it is feasible to stop the transmission by a required time. This required time may be or may be related to the time at which the second grant data is to be transmitted.

The PHY layer may determine if the transmission associated with the first grant relates to control information associated to at least one logical channel with priority higher than that associated with the second grant.

This may allow the PHY to advise the MAC layer if the on-going transmission has uplink control information (UCI) relating to one or more even higher priority logical channels (e.g. via UCI multiplexing in PUSCH) than the new packet that MAC layer is planning to deliver via the second grant. If that is the case, the MAC layer may stop further processing and refrain from interrupting the on-going transmission. Therefore, even if the processing time allows, the potential control information relating to even higher priority logical channel may also be considered. In some embodiments, whether such control information has been multiplexed into PUSCH may not be visible to the MAC layer.

In step T4, there is cancellation of the PUSCH relating to grant 1, if this is feasible and/or preparation or processing of the PUSCH related to the new grant In step T5, a MAC PDU for the second grant, Grant 2, is received from the MAC layer.

Some embodiments have been described in the context of a 5G system. However, this is by way of example only and other embodiments may be used with any other suitable wireless communication systems.

Figure 7:
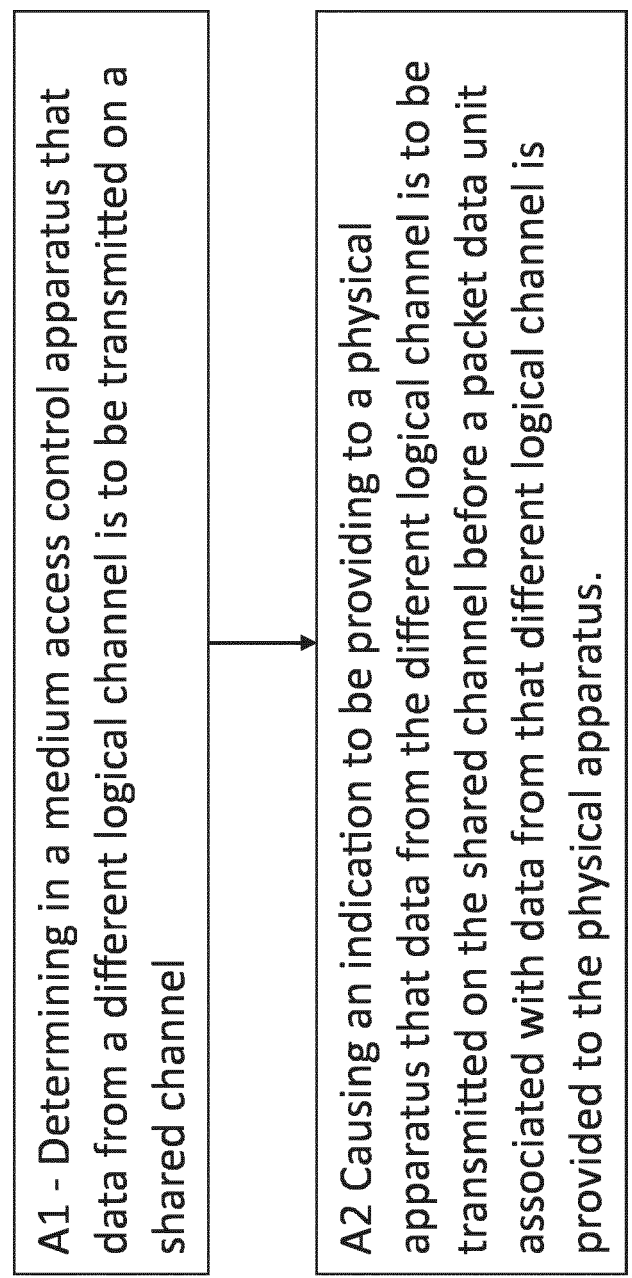
FIG. 7 shows a method of some embodiments.

Reference is made to FIG. 7 which shows a method of some embodiments. The method may be performed in a MAC apparatus.

The method comprises in step A1, determining in the medium access control apparatus that data from a different logical channel is to be transmitted on a shared channel.

The method may comprise in step A2 causing an indication to be provided to a physical apparatus that data from the said different logical channel is to be transmitted on the shared channel before a packet data unit associated with data from that different logical channel is provided to the physical apparatus.

Figure 8:
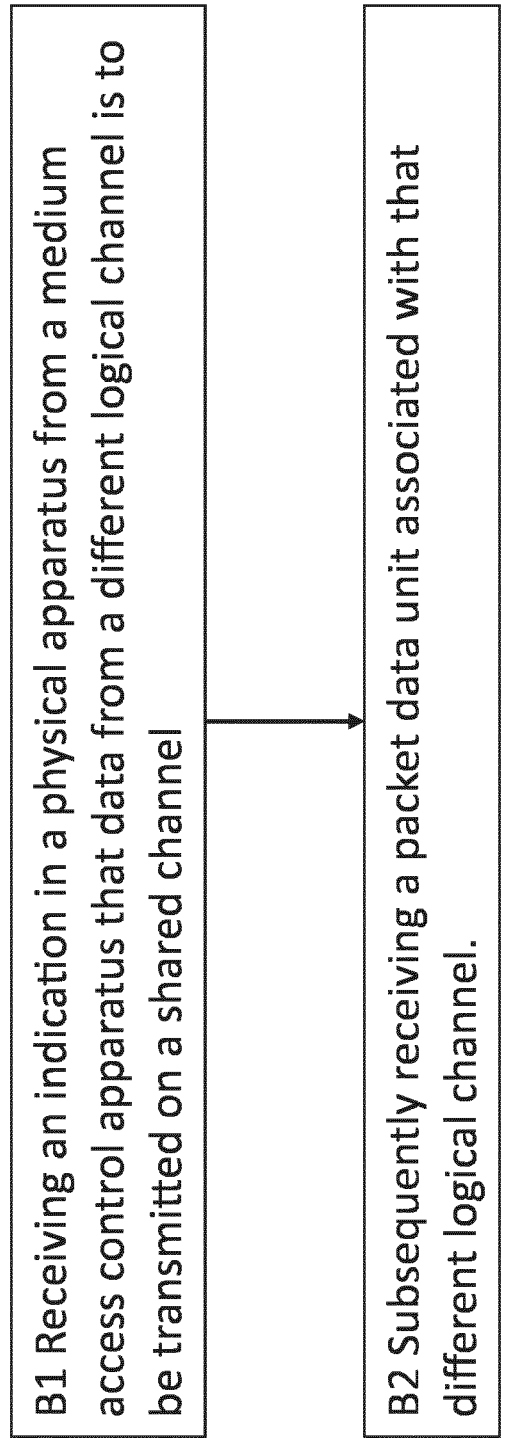
FIG. 8 shows another method of some embodiments.

Reference is made to FIG. 8 which shows a method of some embodiments. The method may be performed in a PHY apparatus.

The method comprises in step B1 receiving an indication in a physical apparatus from a medium access control apparatus that data from a different logical channel is to be transmitted on a shared channel.

The method comprises in step B2, subsequently receiving a packet data unit associated with that different logical channel.

Figure 3:
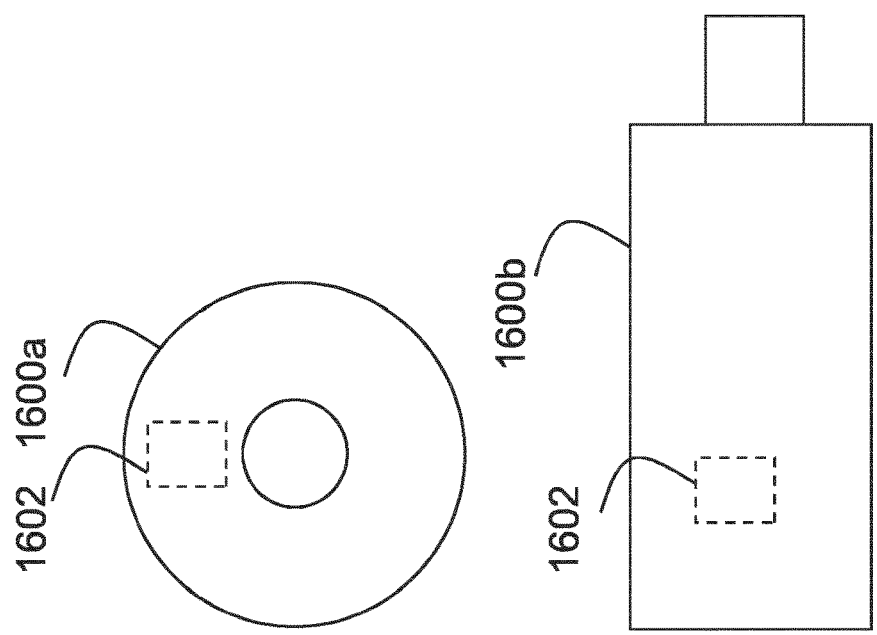
FIG. 3 shows a schematic representation of non-volatile memory media.

FIG. 3 shows a schematic representation of non-volatile memory media 1600*a* (e.g. computer disc (CD) or digital versatile disc (DVD)) and 1600*b* (e.g. universal serial bus (USB) memory stick) storing instructions and/or parameters 1602 which when executed by a processor allow the processor to perform one or more of the steps of any of the methods of any of the embodiments.

It is noted that while the above describes example embodiments, there are several variations and modifications which may be made to the disclosed solution without departing from the scope of the present invention. These aspects may be transposed to other radio access technology systems other than those described purely by way of example.

The embodiments have been described in relation to the PUSCH. It should be appreciated that other embodiments may be used with any suitable physical channel. For example the physical channel may be the PUCCH. For example, for the PUCCH, it could be the case such that PHY layer is transmitting a PUCCH, but then the MAC layer decides to overrides this PUCCH by another PUSCH. The PHY layer may need to cancel this PUCCH based on the indication from MAC layer, and/or vice versa. The PUCCH may carry the SR of certain logical channels, so the MAC can decide based on which logical channel (the one SR is associated to and the one carried by the PUSCH) is higher priority.

Thus embodiments may be used in relation to the PUSCH, the PUSCH in conjunction with one or more other channels, the PUCCH, the PUCCH in conjunction with one or more other channels, the PUCCH and the PUSCH, any suitable physical channel, and any two or more suitable physical channels.

Some embodiments may be used in uplink communications from a terminal.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., in FIGS. 5, 7 and 8 may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
   (i) a combination of analogue and/or digital hardware circuit(s) with software/firmware and
   (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example an integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. A method comprising:
determining in a medium access control apparatus that data from a different logical channel is to be transmitted on a shared channel; and
causing an indication to be provided from the medium access control apparatus to a physical apparatus that indicates that the data from the different logical channel is to be transmitted on the shared channel;
wherein the indication provided from the medium access control apparatus to the physical apparatus that indicates that the data from the different logical channel is to be transmitted on the shared channel is provided before a packet data unit associated with the data from the different logical channel is provided from the medium access control apparatus to the physical apparatus.

2. The method as claimed in claim 1, wherein the indication comprises information indicating that a transmission which is currently being conducted or is to be conducted on the shared channel is to stop.

3. The method of claim 2, wherein said transmission which is currently being conducted or is to be conducted on the shared channel is one of cancelled or delayed.

4. The method as claimed in claim 1, wherein said determining comprises determining that a different logical channel is associated with a higher priority than at least one logical channel relating to the transmission which is currently being conducted or is to be conducted on the shared channel.

5. The method as claimed in claim 1, wherein the indication comprises information indicating that the different logical channel is associated with a higher priority.

6. The method as claimed in claim 1, wherein multiple transmissions are currently being conducted or are to be conducted on the shared channel and the indication comprises information indicating which of the multiple transmissions is to be stopped.

7. The method as claimed in claim 1, wherein said indication comprises information indicating when a transmission of said packet data unit associated with the data from the different logical channel is to start.

8. The method as claimed in claim 1, comprising receiving from said physical apparatus information indicating if it is feasible to stop a transmission which is currently being conducted or is to be conducted on the shared channel.

9. The method as claimed in claim 8, further comprising in response to the information indicating that it is not feasible to stop the transmission which is currently being conducted or is to be conducted on the shared channel, stopping processing of packet data units associated with the different logical channel.

10. The method as claimed in claim 8, further comprising in response to the information indicating that it is feasible to stop the transmission which is currently being conducted or is to be conducted on the shared channel, processing the packet data units associated with the different logical channel, and delivering the packet data units to the physical apparatus.

11. The method as claimed in claim 1, comprising receiving from said physical apparatus information indicating if it is feasible to stop a transmission which is currently being conducted or is to be conducted on the shared channel before the transmission of said packet data unit associated with the data from the different logical channel is due to start.

12. A method comprising:
determining in a medium access control layer of a communication device apparatus that data from a different logical channel is to be transmitted on a shared channel;
receiving with the medium access control layer of the communication device from a physical layer of the communication device information indicating whether it is feasible to stop a transmission which is currently being conducted or is to be conducted on the shared channel; and
determining in the medium access control layer of the communication device to stop processing of at least one packet data unit associated with the different logical channel, in response to the information received with the medium access control layer of the communication device from the physical layer of the communication device indicating that it is not feasible to stop the transmission which is currently being conducted or is to be conducted on the shared channel.

13. A method comprising:
receiving an indication in a physical apparatus from a medium access control apparatus that indicates that data from a different logical channel is to be transmitted on a shared channel;
wherein the indication received in the physical apparatus from the medium access control apparatus that indicates that the data from the different logical channel is to be transmitted on the shared channel is received before a packet data unit associated with the data from the different logical channel is received with the physical apparatus from the medium access control apparatus; and
receiving the packet data unit associated with the data from the different logical channel subsequent to receiving the indication in the physical apparatus from the medium access control apparatus that indicates that the data from the different logical channel is to be transmitted on the shared channel.

14. The method as claimed in claim 13, wherein the indication comprises information indicating that a transmission which is currently being conducted or is to be conducted on the shared channel is to stop.

15. The method of claim 14, wherein said transmission which is currently being conducted or is to be conducted on the shared channel is one of cancelled or delayed.

16. The method as claimed in claim 13, wherein the indication comprises information indicating that the different logical channel is associated with a higher priority.

17. The method as claimed in claim 13, wherein multiple transmissions are currently being conducted or are to be conducted on the shared channel and the indication comprises information indicating which of the multiple transmissions is to be stopped.

18. The method as claimed in claim 13, wherein said indication comprises information indicating when the transmission of said packet data unit associated with the data from the different logical channel is to start.

19. The method as claimed in claim 13, comprising providing information from said physical apparatus to said medium access control apparatus indicating if it is feasible to stop a transmission which is currently being conducted or is to be conducted on the shared channel.

20. The method of claim 19, comprising determining in dependence on said indication if it is feasible to stop the transmission which is currently being conducted or is to be conducted on the shared channel.

21. The method as claimed in claim 13, comprising providing information to the medium access control apparatus indicating if it is feasible to stop a transmission which is currently being conducted or is to be conducted on the shared channel before the transmission of said packet data unit associated with the data from the different logical channel is due to start.

22. A method comprising:
receiving an indication in a physical layer of a communication device from a medium access control layer of the communication device that data from a different logical channel is to be transmitted on a shared channel; and
providing information from the physical layer of the communication device to the medium access control layer of the communication device indicating whether it is feasible to stop a transmission which is currently being conducted or is to be conducted on the shared channel;
wherein the information provided from the physical layer of the communication device to the medium access control layer of the communication device is configured to be used with the medium access control layer of the communication device to determine to stop processing of at least one packet data unit associated with the different logical channel, when the information provided from the physical layer of the communication device to the medium access control layer of the communication device indicates that it is not feasible to stop the transmission which is currently being conducted or is to be conducted on the shared channel.

23. The method as claimed in claim 13, wherein the shared channel comprises one or more physical uplink channels.

24. The method of claim 1, wherein the indication that indicates that the data from the different logical channel is to be transmitted on the shared channel is provided from the medium access control apparatus to the physical apparatus before the packet data unit associated with the data from the different logical channel is provided to the physical apparatus to provide the physical apparatus an additional time budget for preparation of pre-emption of a transmission which is currently being conducted or is to be conducted on the shared channel.

25. The method of claim 1, wherein the indication that indicates that the data from the different logical channel is to be transmitted on the shared channel is provided from the medium access control apparatus to the physical apparatus before the medium access control apparatus generates the packet data unit associated with the data from the different logical channel.

26. The method of claim 1, wherein the indication that indicates that the data from the different logical channel is to be transmitted on the shared channel is provided from a medium access control layer of a communication device to a physical layer of the communication device before the packet data unit associated with the data from the different logical channel is provided from the medium access control layer of the communication device to the physical layer of the communication device, wherein the medium access control layer of the communication device comprises the medium access control apparatus and the physical layer of the communication device comprises the physical apparatus.

27. The method of claim 12, further comprising:
stopping processing of at least one packet data unit associated with the different logical channel, in response receiving with the medium access control layer of the communication device from the physical layer of the communication device information indicating that the physical layer of the communication device is not able to stop the transmission which is currently being conducted or is to be conducted before a time for starting the transmission of the data from the different logical channel;
wherein the information received with the medium access control layer of the communication device from the physical layer of the communication device indicating whether it is feasible to stop the transmission which is currently being conducted or is to be conducted on the shared channel comprises the information indicating that the physical layer of the communication device is not able to stop the transmission which is currently being conducted or is to be conducted before the time for starting the transmission of the data from the different logical channel.

28. The method of claim 27, wherein the information received with the medium access control layer of the communication device from the physical layer of the communication device indicating that the physical layer of the communication device is not able to stop the transmission which is currently being conducted or is to be conducted before the time for starting the transmission of the data from the different logical channel is due to at least one hardware constraint related to at least one physical component of the communication device comprising the medium access control layer and the physical layer.

29. The method of claim 12, further comprising:
stopping processing of the at least one packet data unit associated with the different logical channel, in response to the information received with the medium access control layer of the communication device from the physical layer of the communication device indicating that a logical channel associated with the transmission which is currently being conducted or is to be conducted on the shared channel has a higher priority than the different logical channel associated with the at least one packet data unit;
wherein the information received with the medium access control layer of the communication device from the physical layer of the communication device that indicates whether it is feasible to stop the transmission which is currently being conducted or is to be conducted on the shared channel further indicates whether the logical channel associated with the transmission which is currently being conducted or is to be conducted on the shared channel has a higher priority than the different logical channel associated with the at least one packet data unit.

30. A non-transitory computer readable medium comprising instructions stored thereon for performing at least the method of claim 1.

31. A non-transitory computer readable medium comprising instructions stored thereon for performing at least the method of claim 12.

32. A non-transitory computer readable medium comprising instructions stored thereon for performing at least the method of claim 13.

33. A non-transitory computer readable medium comprising instructions stored thereon for performing at least the method of claim 22.

34. An apparatus comprising:
at least one processor; and
at least one memory storing instructions that, when executed by the at least one processor,
cause the apparatus at least to:
determine in a medium access control apparatus of the apparatus that data from a different logical channel is to be transmitted on a shared channel; and
cause an indication to be provided from the medium access control apparatus to a physical apparatus of the apparatus that indicates that the data from the different logical channel is to be transmitted on the shared channel;
wherein the indication provided from the medium access control apparatus to the physical apparatus that indicates that the data from the different logical channel is to be transmitted on the shared channel is provided before a packet data unit associated with the data from the different logical channel is provided from the medium access control apparatus to the physical apparatus.

35. An apparatus comprising:
at least one processor; and
at least one memory storing instructions that, when executed by the at least one processor, cause the apparatus at least to:
determine in a medium access control layer of a communication device that data from a different logical channel is to be transmitted on a shared channel, wherein the apparatus comprises the communication device;
receive with the medium access control layer of the communication device from a physical layer of the communication device information indicating whether it is feasible to stop a transmission which is currently being conducted or is to be conducted on the shared channel; and
determine in the medium access control layer of the communication device to stop processing of at least one packet data unit associated with the different logical channel, in response to the information received with the medium access control layer of the communication device from the physical layer of the communication device indicating that it is not feasible to stop the transmission which is currently being conducted or is to be conducted on the shared channel.

36. An apparatus comprising:

at least one processor; and at least one memory storing instructions that, when executed by the at least one processor, cause the apparatus at least to:

receive an indication in a physical apparatus of the apparatus from a medium access control apparatus of the apparatus that indicates that data from a different logical channel is to be transmitted on a shared channel;

wherein the indication received in the physical apparatus from the medium access control apparatus that indicates that the data from the different logical channel is to be transmitted on the shared channel is received before a packet data unit associated with the data from the different logical channel is received with the physical apparatus from the medium access control apparatus; and receive the packet data unit associated with the data from the different logical channel subsequent to receiving the indication in the physical apparatus from the medium access control apparatus that indicates that the data from the different logical channel is to be transmitted on the shared channel.

37. An apparatus comprising:

at least one processor; and at least one memory storing instructions that, when executed by the at least one processor, cause the apparatus at least to:

receive an indication in a physical layer of a communication device from a medium access control layer of the communication device that data from a different logical channel is to be transmitted on a shared channel, wherein the apparatus comprises the communication device; and provide information from the physical layer of the communication device to the medium access control layer of the communication device indicating whether it is feasible to stop a transmission which is currently being conducted or is to be conducted on the shared channel;

wherein the information provided from the physical layer of the communication device to the medium access control layer of the communication device is configured to be used with the medium access control layer of the communication device to determine to stop processing of at least one packet data unit associated with the different logical channel, when the information provided from the physical layer of the communication device to the medium access control layer of the communication device indicates that it is not feasible to stop the transmission which is currently being conducted or is to be conducted on the shared channel.

* * * * *